(12) United States Patent
Cellini

(10) Patent No.: US 6,394,477 B1
(45) Date of Patent: May 28, 2002

(54) CHAINLESS BICYCLE DRIVE SYSTEM

(76) Inventor: Vito Cellini, 3115 Old Ranch Rd., San Antonio, TX (US) 78217

( * ) Notice: Subject to any disclaimer, the term of this patent is extended or adjusted under 35 U.S.C. 154(b) by 0 days.

(21) Appl. No.: 09/523,429

(22) Filed: Mar. 10, 2000

(51) Int. Cl.⁷ .............................. B62M 1/02; F16H 1/16
(52) U.S. Cl. ........................................ 280/260; 74/425
(58) Field of Search ...................... 474/74–77; 280/260, 280/259, 236, 274, 238; 74/417, 350, 425, 1, 594.1–594.3

(56) References Cited

U.S. PATENT DOCUMENTS

| | | | | |
|---|---|---|---|---|
| 618,356 A | * | 1/1899 | Johnson | 280/260 |
| 632,306 A | * | 9/1899 | Bryant | 280/260 |
| 4,943,077 A | * | 7/1990 | Lin et al. | 280/260 |
| 5,299,819 A | * | 4/1994 | Leu | 280/260 |
| 5,482,306 A | * | 1/1996 | Hsu | 280/260 |
| 5,522,612 A | * | 6/1996 | Considine | 280/260 |
| 5,967,537 A | * | 10/1999 | Chang | 280/259 |
| 6,155,127 A | * | 12/2000 | Pogson | 74/350 |

\* cited by examiner

Primary Examiner—David A. Bucci
Assistant Examiner—Marcus Charles
(74) Attorney, Agent, or Firm—Christopher L. Makay

(57) ABSTRACT

A pedal driven wheeled vehicle includes a frame and a driven wheel with a driven hub engaged with the frame. A driven system includes a first pedal crank arm and a second crank arm. A first pedal is located at a removed end of the first pedal crank arm, and a second pedal is located at a removed end of the second pedal crank arm. A pedal driven shaft includes a longitudinal axis, a first end, and a second end and is rotatably mounted to the frame of the pedal driven shaft. The second pedal crank arm attaches to the second end of the pedal driven shaft. The pedal driven shaft includes a first gear mounted thereto such that the first gear rotates in a first plane. A hub engagement gear engages with the driven wheel hub of the driven wheel. A driven shaft includes a first and a second end. The first end includes a first end worm gear for engagement with the first gear of the pedal driven shaft, and the second end includes a second end worm gear for engagement with the hub engagement gear such that when the pedal crank arms are rotated the rear wheel rotates.

16 Claims, 7 Drawing Sheets

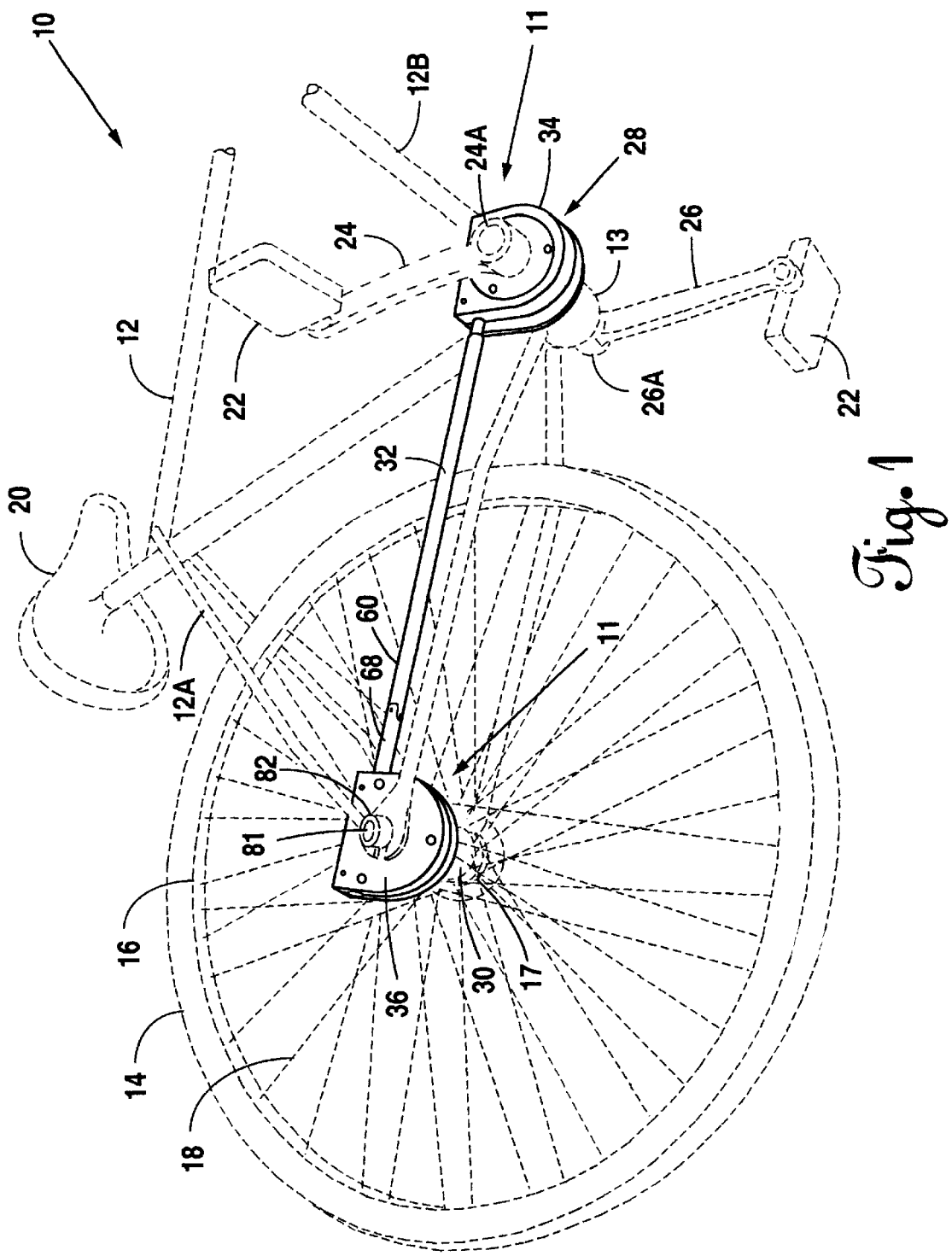

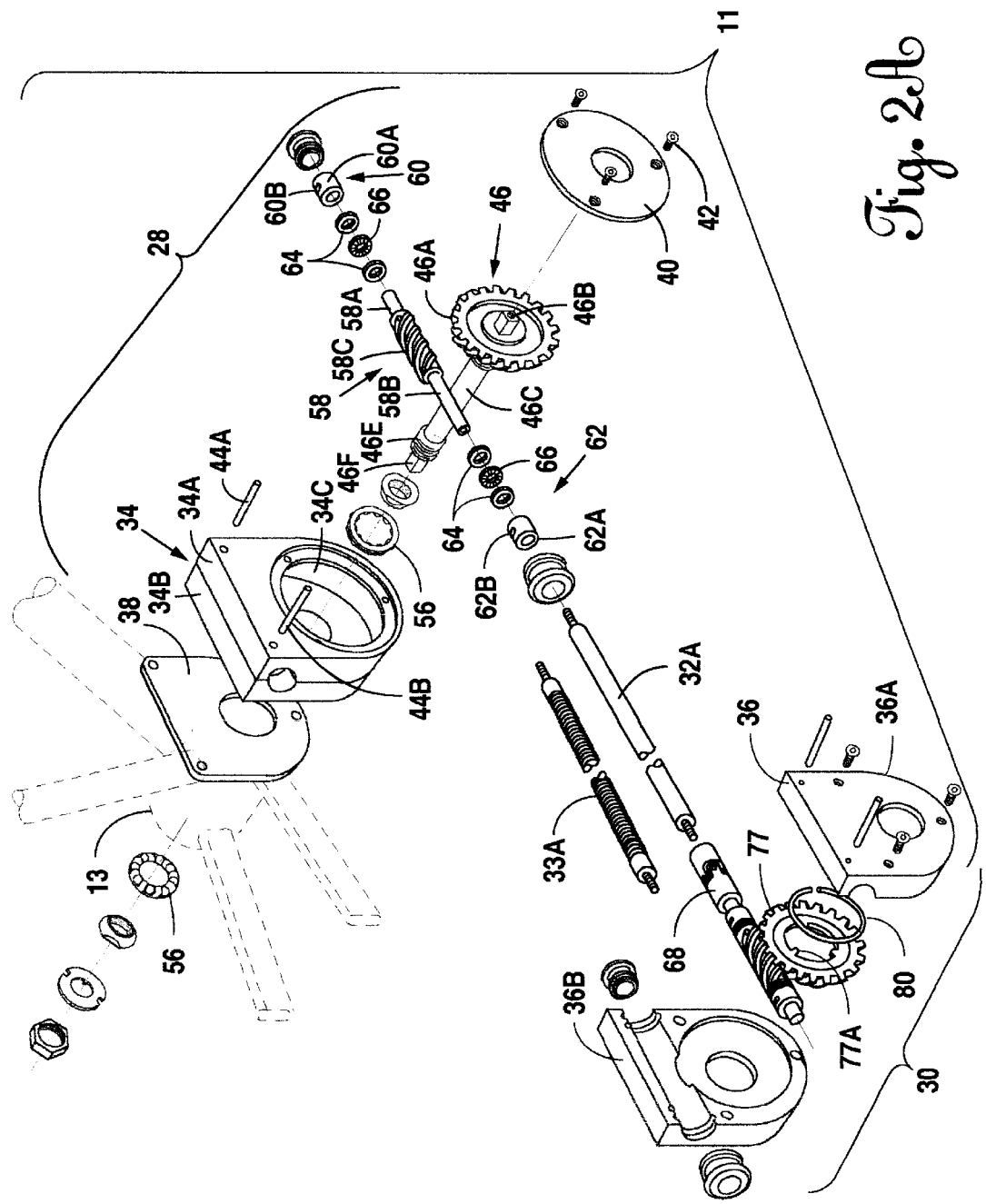

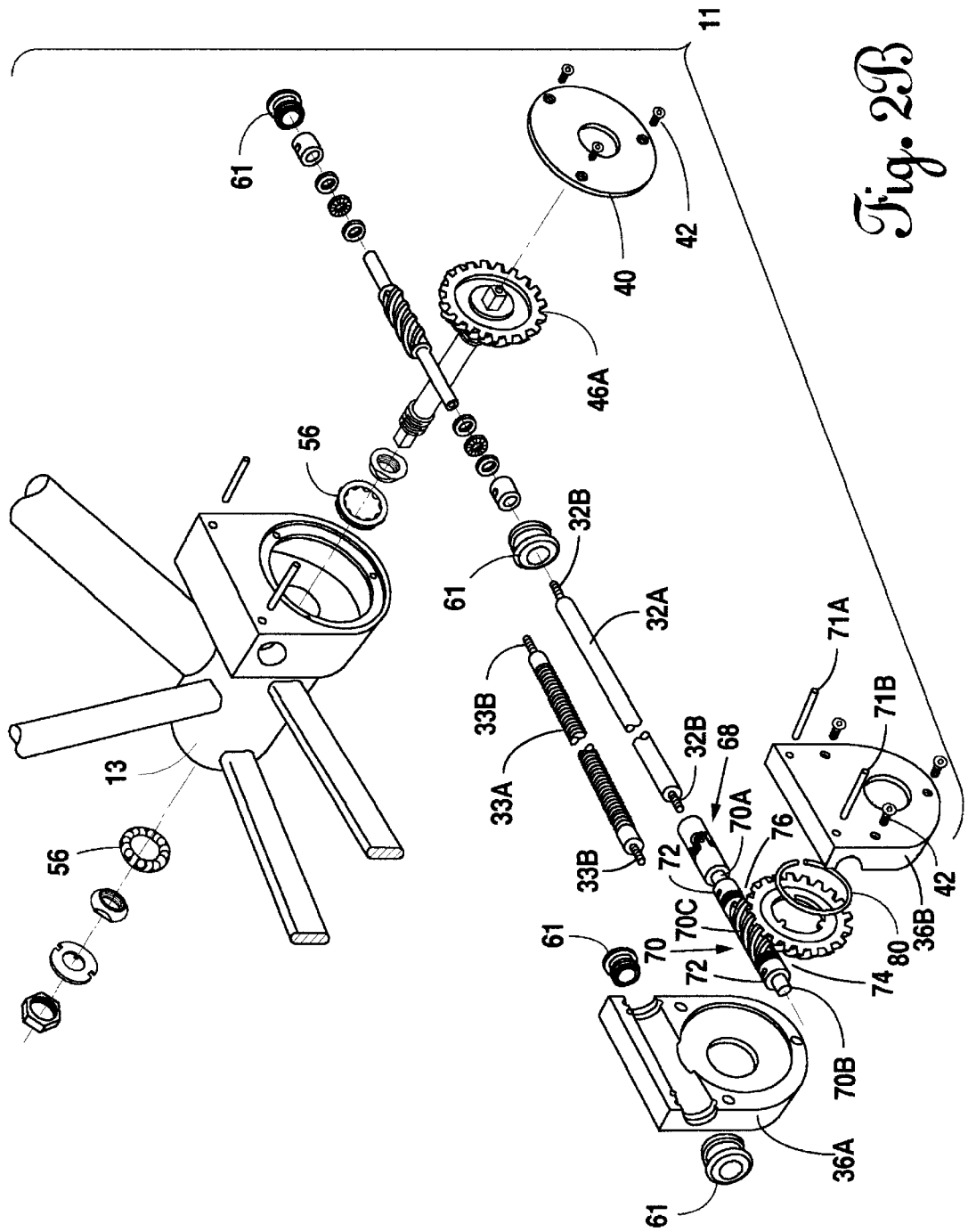

CHAINLESS BICYCLE DRIVE SYSTEM

FIELD OF THE INVENTION

A system to drive the drivewheel of a pedal driven vehicle, more specifically, a chainless bicycle drive system.

BACKGROUND OF THE INVENTION

Bicycles typically have a frame, seat, front end with a front wheel and a pedal driven rear wheel. The chain engages a pedal driven sprocket and a hub mounted sprocket to move the bicycle. This works well enough with most applications. However, the chain may present a danger, especially with children, where fingers may be caught between the chain and the sprocket. A further disadvantage of chains is that they are prone to wear; they are noisy and dirty; and often times will come off their sprocket if not adjusted properly. Thus, a utility lies in replacing a chain with an alternate drive system that does not have these disadvantages, yet efficiently propels the machine.

Applicant provides such objectives, including the further objective of being simple, efficient, relatively maintenance free and readily retrofittable to existing bicycle frames.

Applicant's objectives are met in providing a drive system for a pedal driven, wheeled vehicle, in which a gear driven drive shaft transmits rotary motion of a pedal driven geared shaft to hub mounted drive shaft engaging rear gear. Other advantages of Applicants system may be appreciated with reference to the specifications.

BRIEF DESCRIPTION OF THE DRAWINGS

FIG. 1 is a perspective side view of a bicycle and Applicant's novel drive system.

FIG. 2A is an exploded view of Applicant's drive system.

FIG. 2B is another exploded view of Applicant's novel drive system featuring a one piece drive gear housing.

DETAILED DESCRIPTION OF THE PREFERRED EMBODIMENT

Figure 3:
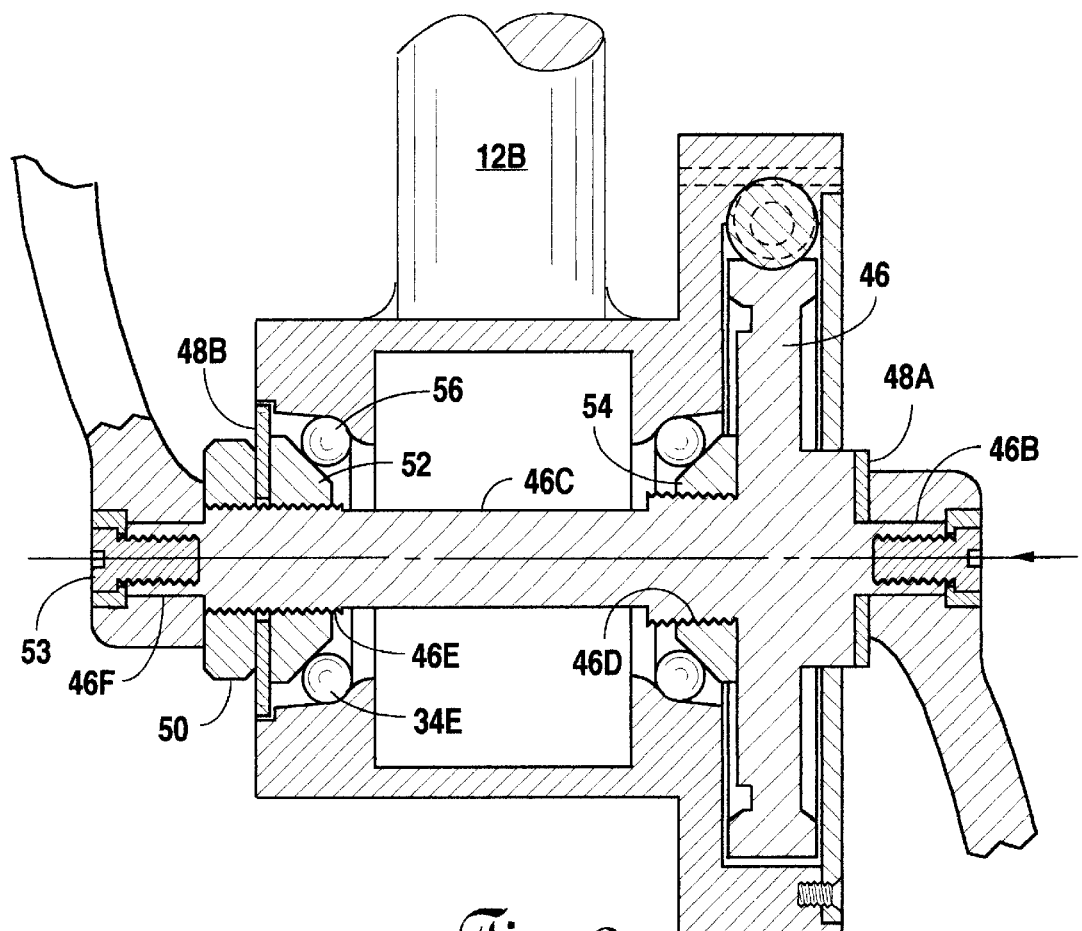
FIG. 3 is a cross-section elevational view of a portion Applicant's novel drive system illustrating a one piece housing.

FIG. 1. illustrates a bicycle 10 (front end missing but known in the prior art), the bicycle including Applicant's unique drive system 11 (see also FIG. 2A). In FIG. 1 bicycle 10 is seen to have a frame 12, the frame can be typical of bicycle frames in general, being made up of tubular steel or tubular aluminum. The frames are typically triangular and have a seat 20 at one apex, the front steering head at another apex and a pedal housing 13 at the third apex. This describes a typical prior art bicycle frame. Usually the pedal housing 13 is joined by a front down tube 12B that runs from the steering head to the pedal housing 13. Also found on most prior art bicycle frames are rear wheel mounting members 12A (typically four).

Bicycles include a wheel, here rear wheel 14 mounted to a rim 16. Spokes 18 maintain alignment between rim 16 and rear hub 17. Pedals 22 are located on the outboard or removed ends of a right pedal crank arm 24 and a left pedal crank arm 26. Applicant's novel invention drive system 11 includes a pedal driven unit 28 and a wheel drive unit 30 connected by a drive shaft 32. Applicant's pedal driven unit may include a housing 34 and Applicant's wheel drive unit 30 may include a housing 36. Between the pedal driven unit 28 and the wheel drive unit 30 there is a drive shaft 32 (straight tube or rod) or 33 (coil spring, See FIG. 2A), the drive shaft typically including a universal joint 68. FIG. 1 also illustrates a rear axle 81 for rotatably mounting the rear hub 17 thereto and a rear axle securing nut 82. FIG. 1, in conclusion, provides the ground work for understanding in detail Applicant's drive system 11, which detail is provided in the following figures.

Turning to FIGS. 2A, 2B, 3 and 4, it is seen that pedal driven unit 28 includes either a 2-piece (FIGS. 2A and 4) or a 1-piece (FIGS. 2B and 3) housing 34 for the pedal driven unit 28. More specifically, it is seen with reference to FIG. 2A and FIG. 4 that pedal driven unit 28 may include a pedal driven unit housing 34, the housing having a right half 34A and a left half 34B held together by fasteners 42.

With respect to both embodiments (FIG. 2A/4 or FIG. 2B/3) it is seen that housing 34 of the pedal driven unit includes a center cutout 34C and with respect to the single piece housing 34 illustrated in FIGS. 2B and 3, a radius portion 34E to help seat the ball bearings 56.

FIGS. 2A and 2B illustrate wheel drive unit 30 having a housing 36 that is typically constructed from 2 half portions 36A and 36B held together by fasteners 42 as shown in the illustrations.

Figure 4:
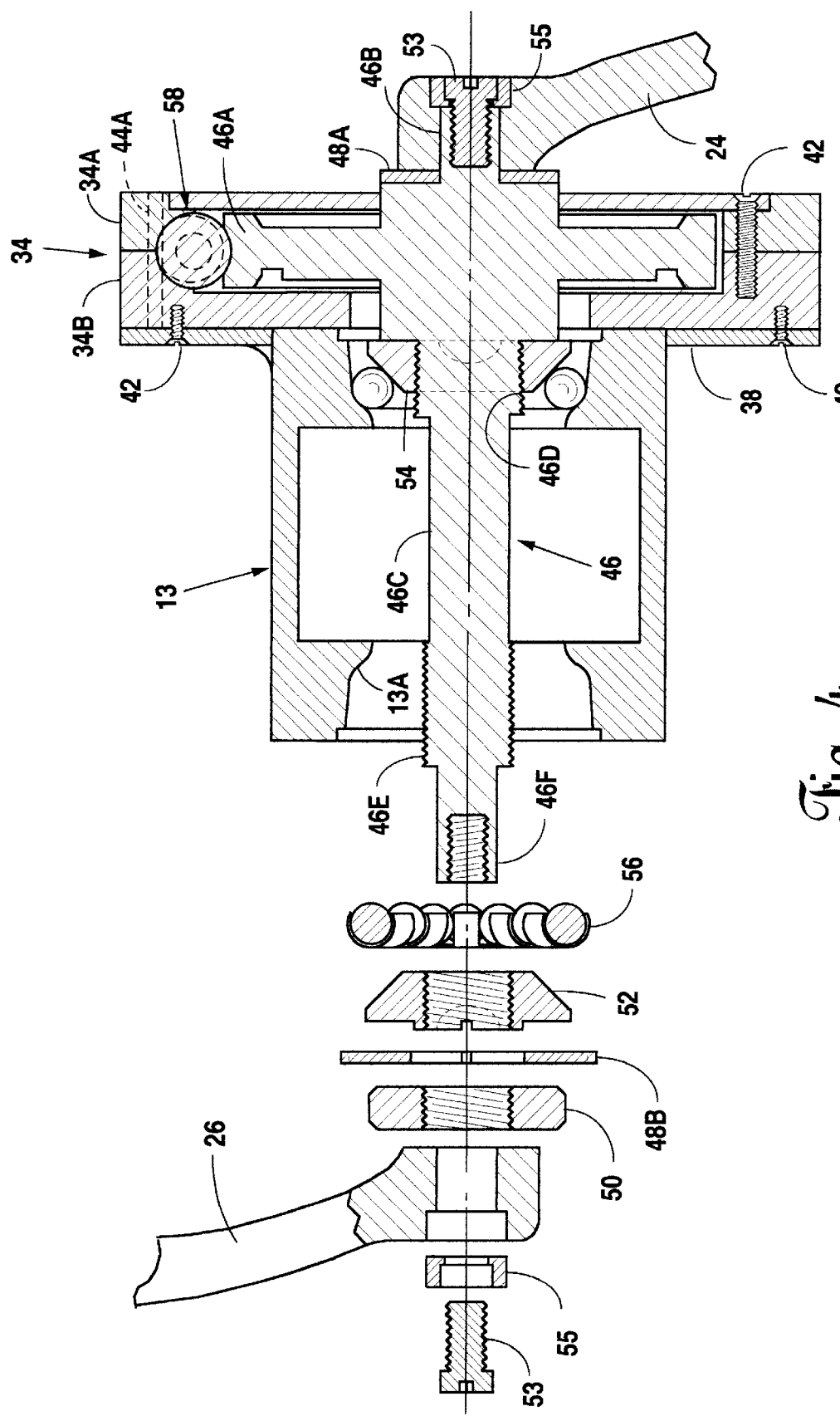
FIG. 4 is a cross-section elevational view of the housing of Applicant's pedal driven unit, the housing having two parts.
Figure 5:
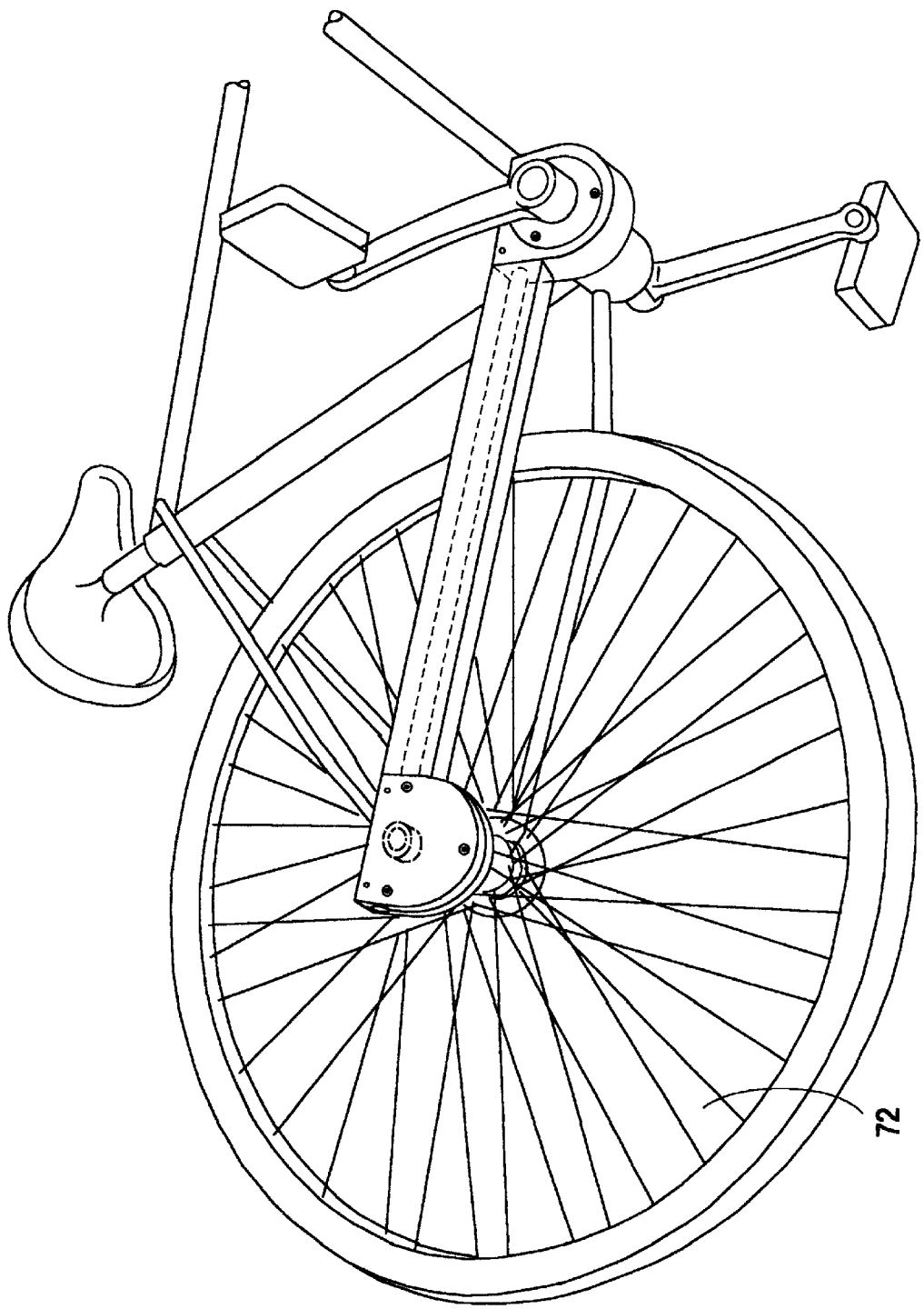
FIG. 5 is a perspective view of an alternate preferred embodiment of Applicant's present invention wherein the drive shaft is enclosed in a housing.
Figure 6:
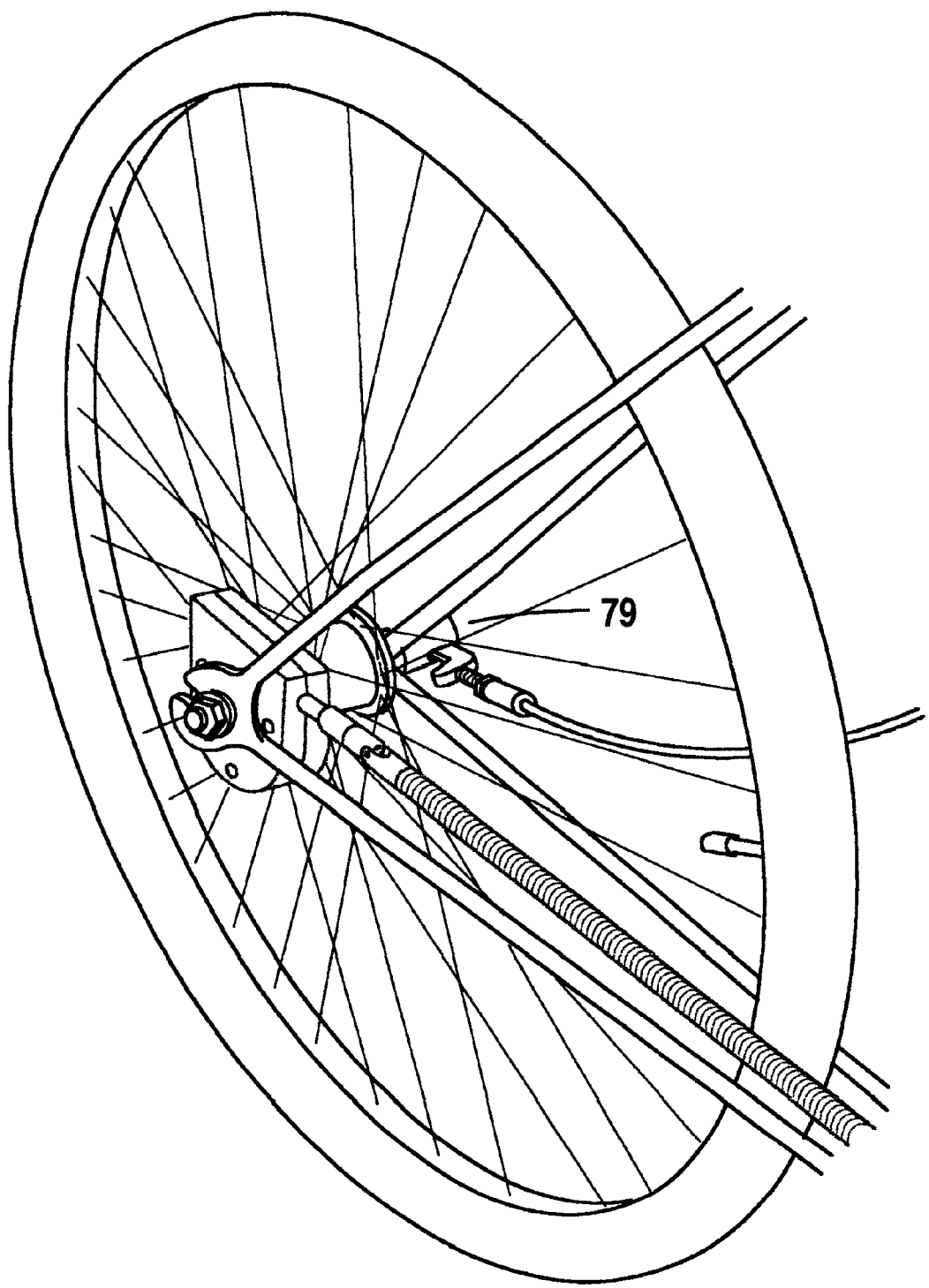
FIG. 6 is a perspective view of Applicant's wheel drive unit showing a shifter bell crank for integrating with a rear wheel hub so as to provide a gear change mechanism of Applicant's drive system.

Turning back to pedal driven unit 28, more specifically housing 34 it is seen that the housing may include a cover 40 held to the housing by the use of fasteners 42 (See also FIGS. 3 and 4). Dowel pins 44A and 44B and 71A and 71B are driven at least partway into the housings 34 and 36 to function as set forth in more detail below.

Turning again to FIGS. 2A, 2B, 3 and 4, Applicant notes that the pedal driven unit 28 includes a main drive gear 46 including a longitudinal shaft 46C having pedal mounting studs 46B and 46F at the removed ends thereof and, just inboard from the pedal driven studs there is a right hand threaded portion 46D and a left hand threaded portion 46E.

Just inboard either one of the two pedal mounting studs, typically just inboard the right hand pedal mounting stud 46B there is found, as part of the main drive gear 46 a toothed gear wheel 46A. It is seen that when the near end 24A of right pedal crank arm 24 and the near end 26A of left pedal crank arm 26 are attached to the mounting studs 46B and 46F respectively, rotation of the two crank arms will cause the main gear drive 46 which is mounted rotatably with respect to the frame and perpendicular thereto, to rotate. In other words, it is clear with reference to the figures that rotating the pedals with cause the shaft to rotate with respect to the frame and cause the toothed gear wheel 46A to rotate in a plane parallel to the plane of pedal rotation.

The manner of attaching the main drive gear 46 to the frame so that it may freely rotate when the pedals are pushed is apparent with reference to the attached figures. More specifically it is seen that spacers 48A and 48B may be provided. Spacer 48A typically provides spacing between the right pedal crank arm 24 and the main drive gear 46 as seen in FIGS. 3 and 4, and spacer 48B provides separation between a locking nut 50 and a threaded bearing member 52 as set forth in FIG. 3 and 4, the locking nut and the threaded bearing member being threaded onto left hand threaded portion 46E of main drive gear 46. Further it is seen that locking nuts 53 seated against locking nut washer 55 may thread into the right hand removed end of main drive gear 46 here at pedal mounting stud 46D to hold the near end 24A of pedal crank 24 onto pedal mounting stud 46D. The same structure is provided for the left pedal mounting stud 46F and end 26A of pedal crank arm 26 (see FIG. 4). Further it is seen with reference-to FIGS. 3 and 4 how the threaded bearing members 52 and 54 will rotate on ball bearings 56 which also articulate against radius portions 34E of body 34 (see FIG. 2B and 3) or radius portion 13A of an existing pedal housing 13 of the frame. In other words, Applicant's drive system 11 may be retrofitted as illustrated in FIGS. 2A and 4 by either radiusing a portion of the existing pedal housing 13 or modifying the existing pedal housing with inserts or the like that will accept the ball bearings 56.

In either case, it is seen that use of a locking nut and a threaded bearing member on one side and a threaded bearing member on the other will locate the shaft with respect to the frame, or with respect to a housing which has been fixed to the frame. In either case the net effect is to locate a main drive gear 46 having a shaft 46C longitudinal to the planes of rotation of the pedal crank rotatably to the frame of the bicycle.

At this point it is seen that rotation of pedals 22 may cause rotation of the main drive gear shaft 46C having a toothed gear wheel 46A thereon. However, Applicant provides at the first end of drive shaft 32/33 a first worm gear 58, the first worm gear having a forward extension 58A, a rearward extension 58B and a toothed portion 58C. The forward portion 58A of first worm gear 58 engages a roller bearing unit 60 which is located in a housing 60A which housing includes a dowel matching notch 60B. Roller bearing unit 60 is designed to fit in the cutouts of the housing as illustrated in FIGS. 2A, 2B, 3 and 4 and to rotatably support forward portion of worm gear 58. Likewise, a roller bearing unit 62 having a housing 62A and a dowel mating notch 62B is designed to fit in a cutout or cutouts in the housing 34 as illustrated in FIGS. 2A and 2B such that rear portion 58B of first worm gear 58 is supported in the housing such that toothed portion 58C meshes to and with the teeth of toothed gear wheel 46A. Therefore when drive gear 46 is rotated, it will rotate first worm gear 58, which being attached to the forward end of the drive shaft 32/33 will cause the drive shaft to rotate. Note that Applicant may also provide thrust washers 64 and thrust bearings 66 to mate up against the forward and rearward edges of the toothed portion 58C of the first worm gear. The combination thrust washer and thrust bearing is designed to provide the ability when used in conjunction with the roller bearings of maintaining the first worm gear against the toothed wheel since driving the toothed wheel in either a clockwise or counter clockwise direction will first attempt to urge the entire worm gear either in a forward or backward direction, but with the combination of thrust bearings and washers along with the use of the roller bearings held fixedly adjacent in the drive gear housing will cause the worm gear to rotate instead. It is noted that the dowel pins 44A and 44B when driven in to the housing will mate with notches 60B and 62B and roller bearing housing unit 60 and 62 respectively so as to prevent the roller bearing units' movement.

At this point we have seen then that rotation of the drive shaft will cause the first worm gear to rotate. It is noted however that the first worm gear is located at the forward end of the drive shaft and rotation of the drive shaft will cause a second worm gear 70 having a forward portion 70A a rearward portion 70B and a toothed portion 70C to rotate. It is also seen that the thrust washer and thrust bearing combination that is used on the first worm gear is used on the second worm gear 72 and also the notched roller bearing 74 and 76 are used to locate the second worm gear adjacent and meshing with a driven gear 77. Driven gear 77 includes stubs 77A on an inner perimeter thereof which stubs 77A may mate with a gear change system as set forth in more detail below.

Figure 3A:
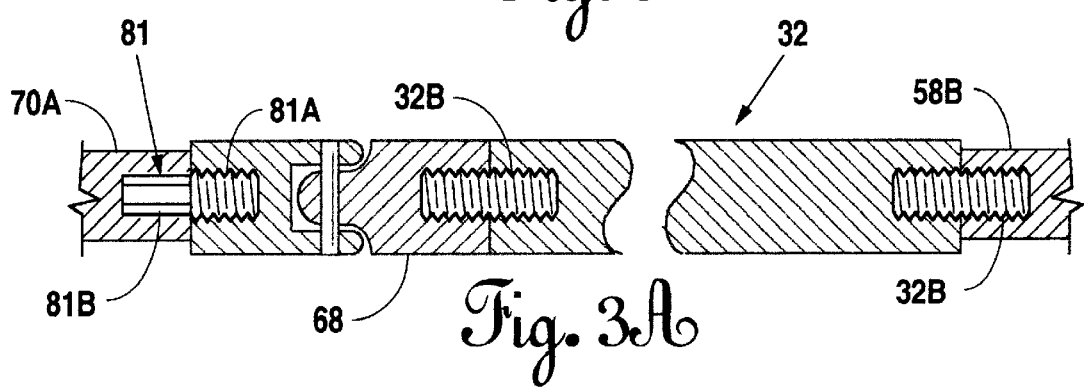
FIG. 3A is a cross-section view in elevation of details of Applicant's drive shaft.

It is noted with reference to FIG. 3A that a threaded stub 32B may join a body portion 32A of the drive shaft 32 with the rearward end 58B of the first worm gear. Likewise, a second threaded stub 32B may join body 32A of drive shaft 32 to the universal joint 68. The universal joint may, in turn, be threaded into a stud 81B with a threaded portion of 81A. Stud 81 has a slide portion 81B to slip fit into a bore in the forward end 70A to allow the rear wheel to slide off.

Figure 3B:
FIG. 3B is a cross-section of the coil spring drive shaft showing how studs engage the spring.

Applicant incorporates herein by reference *Bicycle Service Manual* $2^{nd}$ *Edition* published by Intertec, Overland, Kans. 1985. It is noted with reference to FIG. 3B that Applicant may use as a drive shaft body 33A a coil spring made from tool steel, which may have a Rockwell hardness rating of about 75. Such a coil spring drive shaft body 33A is typically used to provide some lateral flex when, for example, the drive shaft in inadvertently struck. When drive shaft body 33A is used, it is seen with reference to FIG. 3B that a pair of studs 33B may be used at both ends thereof, the studs having a projecting threaded portion for joining the rearward extension of the first worm gear and the universal joint. It is noted, however, that the two studs 33B will have opposite threading on both the portions that thread onto coil spring body 33A and the threaded portion that joins the front worm gear and the portion that joins the universal joint. This is desired so that when the pedals move the bike in a forward direction the threading of the body 33A on the studs and the studs on the worm gear and drive shaft such that the unit will be tending to tightened or compress.

Other features noted with reference to FIGS. 2A and 2B are retaining ring 80 for engagement with driven gear 77. Further, it is noted that driven gear 77 has stubs 77A on an inner perimeter thereof. Applicant notes that stubs 77A provides a pattern consistent with prior art hub gear drive so that stubs 77A may engage prior art drivers. For example, stubs 77A may engage a driver on a coaster brake hub such as the Perry B-500 (See the reference to the Bicycle Manual Page 65) or the driver of a three (or more) speed hub such as the Schimano 3CC such as featured on Page 92 of the Bicycle Manual. A bell crank shifter 79 is typically provided with a prior art gear drive hub. In this way, utilizing the prior art gear driven hub and a pattern of stubs 77A which is standard in the industry Applicant's unique drive system may be used in conjunction with prior art multi-speed hubs with or without coaster brakes to provide for multiple speed to bicycles. Applicant's bicycles may also be fitted with scrub on tire hand brakes such as those well known in the prior art if a coaster brake hub is not used.

This invention also applies to tandem (or more) bicycles or any other chain driven cycle and may be applied to motorcycles.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. In a pedal driven wheeled vehicle having a frame and a driven wheel with a driven hub, the driven wheel for engagement with the frame, a drive system comprising:

a first pedal crank arm and a second pedal crank arm;

a first pedal and a second pedal, the first pedal located at a removed end of the first pedal crank arm and the second pedal located at a removed end of the second pedal crank arm;

a pedal driven shaft, the pedal driven shaft having a longitudinal axis and a first end and a second end, the pedal driven shaft being rotatably mounted to the frame of the pedal driven shaft and the second pedal crank arm attached to the second end of the pedal driven shaft, the pedal driven shaft having a first gear mounted thereto such that the first gear rotates in a first plane, said first plane being perpendicular to the longitudinal axis of the pedal driven shaft;

a hub engagement gear for engagement with the driven wheel hub of the driven wheel;

a drive shaft having a first end and a second end, the first end having a first end worm gear for engagement with the first gear of the pedal driven shaft, the second end having a second end worm gear for engagement with the hub engagement gear such that when the pedal crank arms are rotated the rear wheel rotates;

a first housing for engaging the frame and the drive shaft to maintain the first end worm gear adjacent to and in meshing engagement with the first gear of the pedal driven shaft; and thrust bearings and roller bearings that mount in the first housing and engage the drive shaft.

2. The drive system of claim 1 further including a second housing for maintaining the second end worm gear in meshing engagement with the hub engagement gear.

3. The drive system of claim 2 further including bearings that mount in the second housing and engage the drive shaft.

4. The drive system of claim 3 wherein the bearings include thrust bearings and roller bearings.

5. The drive system of claim 1 wherein the drive shaft includes a universal joint between the first end worm gear and the second end worm gear.

6. The drive system of claim 5 further including a first housing for engaging the frame and the drive shaft to maintain the first end worn gear adjacent to and in meshing engagement with the first gear of the pedal driven shaft.

7. The drive system of claim 6 further including bearings for mounting between the first housing and the drive shaft.

8. The device system of claim 5 further including a second housing for maintaining the second end worm gear in meshing engagement with the hub engagement gear.

9. The drive system of claim 8 further including a second housing for maintaining the second end worm gear in meshing engagement with the hub engagement gear.

10. The drive system of claim 1 wherein the drive shaft includes a coil spring portion.

11. The device system of claim 10 further including a first housing for engaging the frame and the drive shaft to maintain the first end worm gear adjacent to and in meshing engagement with the first gear of the pedal driven shaft.

12. The device system of claim 11 further including bearings that mount in the first housing and engage the drive shaft.

13. The device system of claim 12 wherein the bearings include thrust bearings and roller bearings.

14. The device system of claim 10 further including a second housing for maintaining the second end worm gear in meshing engagement with the hub engagement gear.

15. The device system of claim 14 further including bearings that mount in the second housing and engage the drive shaft.

16. The device system of claim 15 wherein the bearings include thrust bearings and roller bearings.

* * * * *